United States Patent [19]

Weisgerber et al.

[11] Patent Number: 4,850,606

[45] Date of Patent: Jul. 25, 1989

[54] STEERING GEAR

[75] Inventors: Thomas W. Weisgerber; Joseph A. Kruska, both of Saginaw, Mich.

[73] Assignee: General Motors Corporation, Detroit, Mich.

[21] Appl. No.: 156,982

[22] Filed: Feb. 18, 1988

[51] Int. Cl.[4] .............................................. B62D 3/12
[52] U.S. Cl. .................................. 280/96; 741/89.22; 180/79.1
[58] Field of Search ................ 280/96, 771; 180/79.1, 180/150; 74/89.2, 89.22

[56] References Cited

U.S. PATENT DOCUMENTS

| | | | |
|---|---|---|---|
| 576,779 | 2/1897 | Ettenger et al. | 74/89.2 |
| 2,233,248 | 2/1941 | Douglas | 74/499 |
| 3,188,882 | 6/1965 | Whitehouse | 74/506 |
| 4,708,220 | 11/1987 | Noto et al. | 180/79.1 |

FOREIGN PATENT DOCUMENTS 159688 3/1921 United Kingdom ................ 280/96

OTHER PUBLICATIONS

"Five Hundred and Seven Mechanical Movements", Henry T. Brown, Brown & Hall, 1986, pp. 36-37.
"Actuator Fails Safe", Lyle H. McCarty, *Design News*, Nov. 17, 1986, pp. 138-139.

*Primary Examiner*—David M. Mitchell
*Assistant Examiner*—Ross Weaver
*Attorney, Agent, or Firm*—Saul Schwartz

[57] ABSTRACT

An automotive steering gear includes a transverse steering member and a steering shaft like the steering rack and pinion shaft, respectively, of a rack and pinion steering gear. The steering shaft is operatively connected to the steering member through a bi-directional Chinese Windlass which pulls the steering member in opposite directions depending upon the direction of rotation of the steering shaft.

7 Claims, 2 Drawing Sheets

STEERING GEAR

BACKGROUND OF THE INVENTION

In a mechanism commonly identified as a Chinese Windlass, a flexible tension member such as a cable has one end coiled about a first drum and a second end coiled about a second drum having a diameter exceeding the diameter of the first drum. Both drums are fixed on a common shaft and, between the drums, the tension member is looped around a pulley connected to a load. When the Windlass shaft is turned in an appropriate direction, the bigger drum takes up more of the tension member than is paid out by the small drum so that the length of the tension member between the drums decreases and the pulley is drawn toward the drums against the force of gravity. The mechanical advantage of the device is a function of the difference between the diameters of the drums. A steering gear according to this invention represents a novel application of the principle embodied in simple Chinese Windlass' to automotive steering gears.

SUMMARY OF THE INVENTION

This invention is a new and improved automotive steering gear of the type having a transverse steering member functionally like the steering rack of a conventional rack and pinion steering gear and a steering shaft functionally like the pinion shaft of a conventional rack and pinion steering gear. The pinion shaft is rotatable by the driver through a steering wheel and a bi-directional Chinese Windlass disposed between the steering shaft and the transverse steering member such that manual rotation of the steering wheel in either direction shifts the steering member laterally. In the steering gear according to this invention, the steering shaft projects through a slot in the transverse steering member. The big and small drums of the Chinese Windlass are rigidly affixed to the steering shaft on opposite sides of the transverse member and rotate in unison with the steering shaft. The transverse member rotatably supports a pair of pulleys on opposite sides of the steering shaft. An endless tension member is looped around both pulleys and around both drums of the Chinese Windlass. When the steering shaft is manually rotated, the steering member is pulled laterally by an active side of the bi-directional Chinese Windlass while the other or inactive side simply idles in extending fashion. In a preferred embodiment of the steering gear according to this invention, the pulleys are disposed on independently movable sections of the transverse member biased apart by a spring to maintain tension on the endless tension. In another embodiment of the steering gear according to this invention, the Windlass shaft is motor driven for power assisted steering and the outside surfaces of the drums are non-cylindrical to vary the steering ratio of the steering gear.

DESCRIPTION OF THE PREFERRED EMBODIMENT

Figure 1:
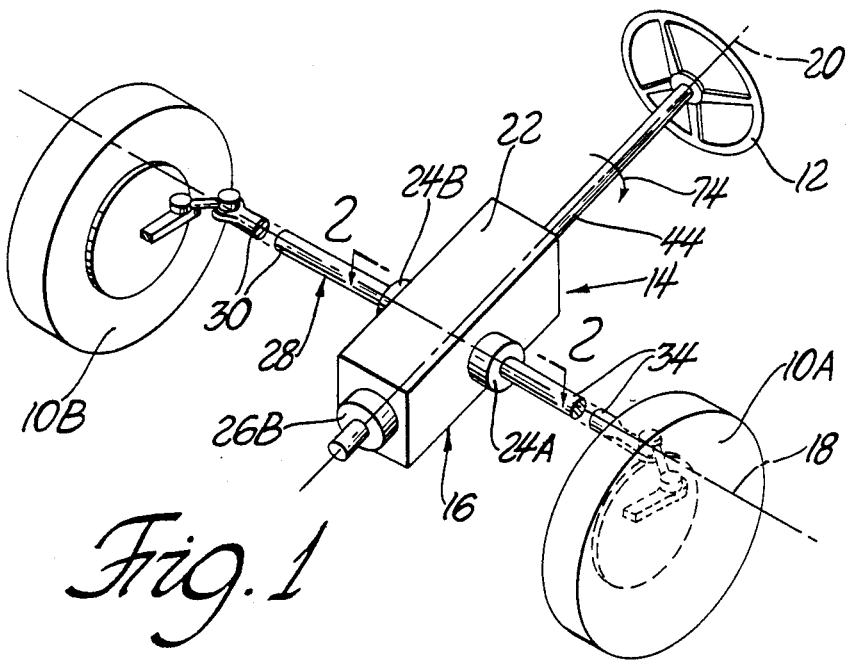
FIG. 1 is a perspective schematic view of an automotive steering system having a steering gear according to this invention.
Figure 2:
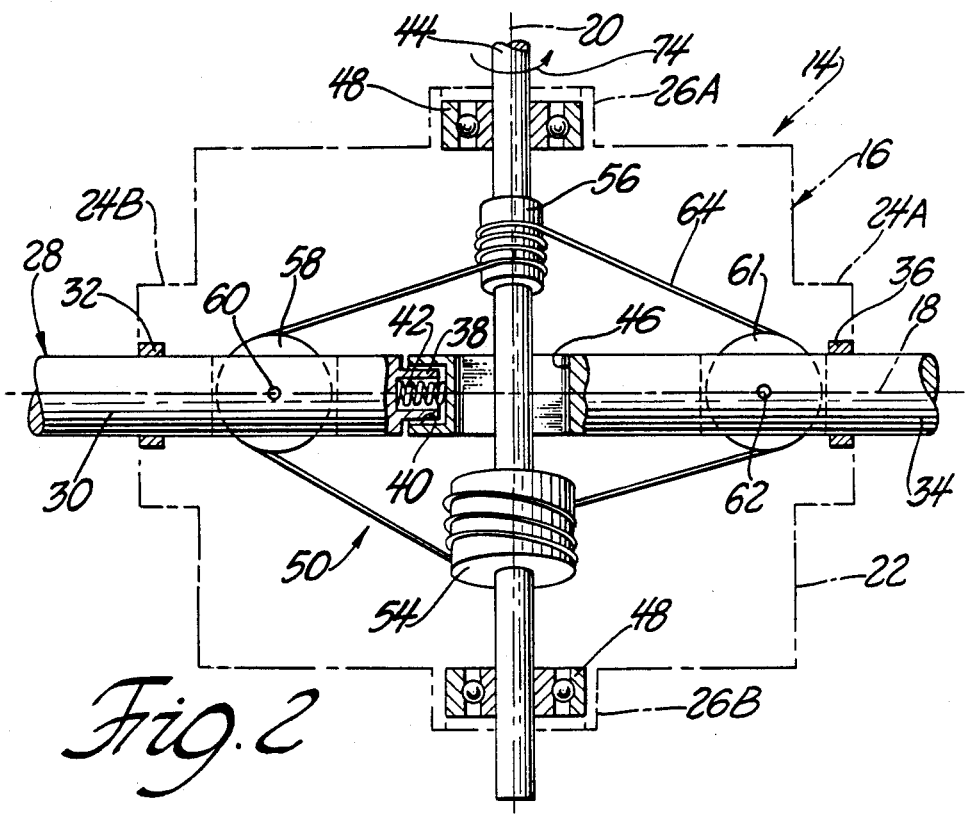
FIG. 2 is a view taken generally along the plane indicated by lines 2—2 in FIG. 1 and showing a partially broken away schematic representation of the steering gear according to this invention.

Referring now to FIGS. 1 and 2 of the drawings, a schematically illustrated steering system for an automobile includes a pair of steerable front dirigible wheels 10A and 10B, a steering wheel 12, and a steering gear 14 according to this invention between the steering wheel and the dirigible wheels. The steering gear 14 includes a schematically illustrated housing 16 adapted for rigid attachment to the sprung mass of the vehicle. The housing 16 defines a transverse main axis 18 extending between the dirigible wheels and a generally fore and aft steering shaft axis 20 which intersects the main axis 18. The housing 16 has a main box 22, a pair of generally cylindrical bearing supports 24A and 24B aligned on the main axis 18, and a similar pair of generally cylindrical bearing supports 26A and 26B aligned on the steering shaft axis 20.

A transverse steering member 28 functionally like a steering rack of a rack and pinion steering gear, is aligned on the main axis 18 and projects through the main box 22. The steering member 28 has a cylindrical first section 30 slidably supported on the housing by a bearing 32 in the bearing support 24B. Similarly, the steering member has a cylindrical second section 34 slidably supported on the housing by a bearing 36 in the bearing support 24A. The first section 30 has a reduced diameter tubular pilot flange 38 at its right or inboard end which is closely but slidably received in a pilot bore 40 in the left or inboard end of the second section 34 so that the steering member is substantially a rigid beam. A compression spring 42 is disposed in the tubular flange 38 between the first and second sections and biases the sections for relative separation. The left or outboard end of the first section 30 connected to the dirigible wheel 10B through a conventional tie rod and knuckle arrangement. The right or outboard end of the second section 34 is likewise conventionally connected to the dirigible wheel 10A.

As seen best in FIG. 2, the steering gear 14 further includes a steering shaft 44 aligned on the steering shaft axis 20. One end of the steering shaft 44 is rigidly connected to the steering wheel 12 so that the steering shaft is rotatable as a unit with the steering wheel. The other end of the steering shaft extends through the main box 22 of the housing 16 and through a clearance slot 46 in the second section 34 of the steering member. A pair of ball bearings 48 disposed in bearing supports 26A and 26B of the housing support the steering shaft on the housing for rotation about the steering shaft axis 20.

The steering shaft 44 is connected to the steering member 28 through a bi-directional Chinese Windlass 50. A simple, uni-directional Chinese Windlass is described on page 36 of *Five Hundred and Seven Mechanical Movements* by Henry T. Brown, originally published by Brown and Hall in 1886. The Chinese Windlass 50 includes a cylindrical big drum 54 fixedly attached to the steering shaft 44 in the main box 22 on one side of the steering member 28 and a cylindrical small drum 56 fixedly attached to the steering shaft 44 in the main box 22 on the other side of the steering member 28.

The Chinese Windlass 50 further includes a first pulley 58 carried in a clearance slot in the first section 30 of the steering member and rotatable relative thereto about a pin 60 on the first section. A second pulley 61 is carried in a clearance slot in the second section 34 of the steering member and is rotatable relative thereto about a pin 62 on the second section.

The Chinese Windlass 50 further includes an endless flexible tension member 64 looped over the pulleys 58 and 61 and helically coiled around each of the drums 54 and 56. As depicted in FIG. 2 of the drawings, the tension member engages the small drum 56 above the horizontal plane of the steering shaft 44 and engages the big drum 54 from below the horizontal plane of the steering shaft 44.

The steering gear 14 operates as follows. The spring 42 has a very high rate so that while it operates to maintain the tension member 64 normally taut, it also transmits axial compression forces between the first and second sections of the steering member with substantially no perceptible relative movement therebetween. When the driver turns the steering wheel 12 and the steering shaft 44 in the direction of arrow 74, FIGS. 1 and 2, the portion of the Chinese Windlass to the right of the axis 20 is the active side and the portion to the left of axis 20 is the inactive or idler side.

That is, the big drum 54 takes up or coils up more of that portion of the tension member 64 looped over the pulley 61 than is uncoiled from the small drum 56. Accordingly, the length of the portion of the tension member 64 to the right, FIG. 2, of the axis 20 decreases and the second section 34 of the steering member is pulled toward the left. The second section 34 of the steering member compresses the spring 42 in an effort to push the first section 30 to the left. Concurrently, the small drum 56 takes up or coils up less of that portion of the tension member 64 looped over the pulley 58 than is uncoiled or released from the big drum 54 so that the length of the portion of the tension member 64 to the left, FIG. 2, of the axis 20 increases. Because the length increase of the tension member 64 on the left side of axis 20 is identical to the length decrease on the right side of the axis 20, the sections 30 and 34 of the steering member move to the left, FIG. 2, as a unit so that the dirigible wheels 10A and 10B are turned in the direction corresponding to a left turn. For turning the vehicle in the opposite direction, the steering wheel 20 is rotated in the opposite direction so that the portion of the Chinese Windlass to the left of axis 20 becomes the active side and the portion to the right becomes the inactive side.

Figure 3:
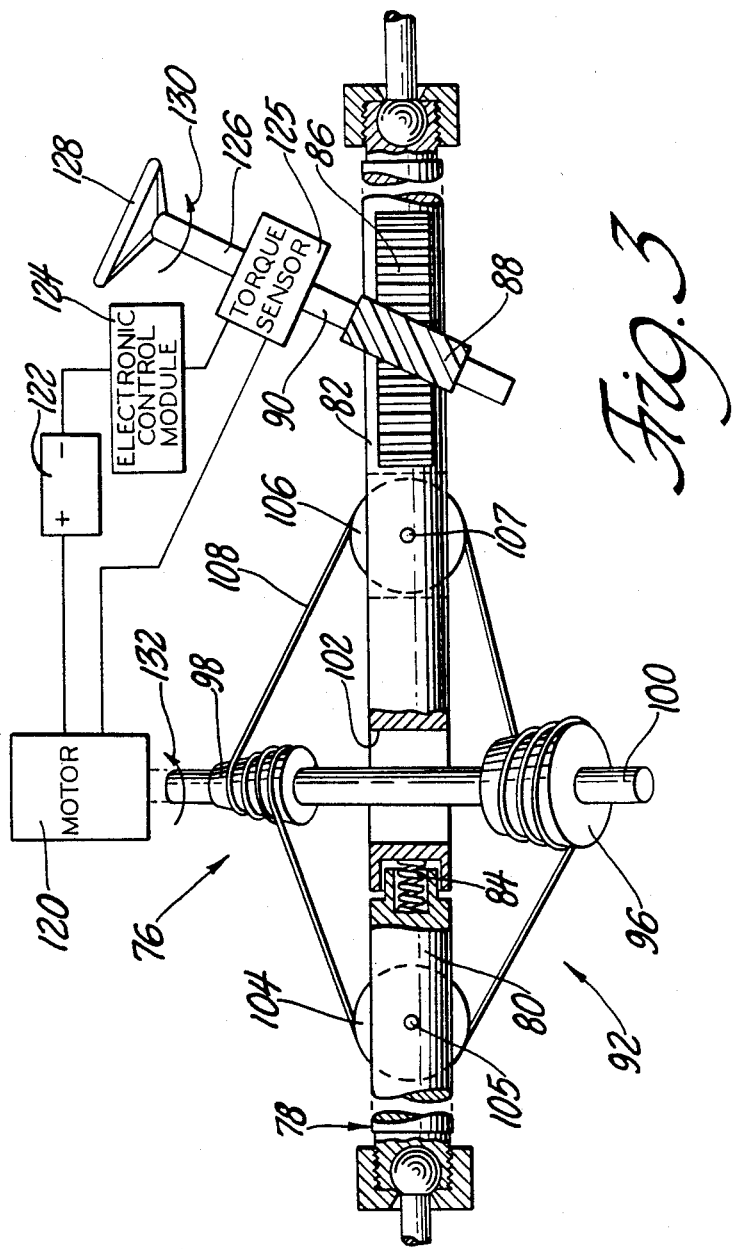
FIG. 3 is similar to FIG. 2 but showing a modified embodiment of the steering gear according to this invention.

Referring to FIG. 3, a schematically illustrated power assisted steering gear 76 according to this invention includes a transverse steering member 78 having a first section 80 and an extended second section 82. The left or inboard end of the second section 82 is piloted on the right or inboard end of the first section 80 and a high rate spring 84 is disposed therebetween. A plurality of rack teeth 86 on the second section of the steering member mesh with a pinion gear 88 on a lower steering shaft 90.

The steering gear 76 further includes a bi-directional Chinese Windlass 92 having a frustoconical big drum 96 and a frustoconical small drum 98 each fixedly attached to a Windlass shaft 100 on opposite sides of the steering member 78. The shaft 100 is remote from the lower steering shaft 90 and projects through a clearance slot 102 in the second section of the steering member. The Chinese Windlass 92 further includes a first pulley 104 rotatable about a pin 105 on the first section 80 of the steering member and a second pulley 106 rotatable about a pin 107 on the second section 82 of the steering member.

An endless flexible tension member 108 of the Chinese Windlass 92 is looped over the pulleys 104 and 106 and is helically coiled around the big and small drums 96 and 98. As depicted in FIG. 3 of the drawings, the tension member engages the small drum 98 above the horizontal plane of the windlass shaft 100 and engages the big drum 96 from below the horizontal plane of the windlass shaft 100. The spacing between the coils on the drums is exaggerated for clarity whereas in practice, the oppositely extending portions of the tension member engage the big drum at the substantially the same diameter thereon and, likewise, the oppositely extending portions of the tension member engage the small drum at the substantially the same diameter thereon.

A reversible electric motor 120 on the vehicle is drivingly connected to the Windlass shaft 100. The motor 120 is powered by a battery 122 and controlled by a conventional electronic controller 124 and a torque sensor 125 disposed between the lower steering shaft 90 and an upper steering shaft 126 rotatable as a unit with a steering wheel 128. The torque sensor permits limited relative twist between the upper and lower steering shafts and responds to the magnitude and direction of manual input at the steering wheel 128 to provide a proportional electronic input signal the controller. The controller switches the motor 120 on in the appropriate direction when the driver turns the wheel and off at the cessation of steering input.

The power assisted steering gear 76 operates as follows. When the driver applies torque to the steering wheel 128 in the direction of arrow 130, for example, the torque sensor 125 and the controller 124 turn the motor 120 on to rotate the Windlass shaft 100 in the direction of arrow 132. When the shaft 100 rotates in the direction of arrow 132, the portion of the Chinese Windlass 92 to the right of the axis of rotation of the shaft 100 is the active side and the portion to the left of the axis of rotation of the shaft 100 is the inactive side as described above. Accordingly, the steering member moves to the left, FIG. 3. When the driver turns the steering wheel in the other direction, the controller and torque sensor turn the motor 120 on in the opposite direction so that the active and inactive sides of the Chinese Windlass reverse and the steering member moves in the opposite direction.

The tapering outside diameters of the big and small drums vary the mechanical advantage of the Chinese Windlass, and hence the steering ratio of the steering gear 76, as a function of the position of the steering member 78 relative to a centered or straight ahead position. The tapers illustrated are only representative of various configuration which may be employed depending upon the steering rations desired in particular applications.

The embodiments of the invention in which an exclusive property or privilege is claimed are defined as follows:

1. In an automotive vehicle having a pair of steerable dirigible wheels supported on a sprung mass portion of said vehicle for steering movement,
    a steering gear comprising:
    a steering member disposed on said sprung mass portion for bodily shiftable movement along a transverse axis of said sprung mass portion,
    means connecting the opposite ends of said steering member to respective ones of said steerable dirigible wheels so that transverse bodily shiftable movement of said steering member effects concurrent steering movement of each of said dirigible wheels, a steering shaft disposed on said sprung mass portion for rotation about an steering shaft axis of said sprung mass portion intersecting said transverse axis, and means defining a bi-directional Chinese Windlass between said steering shaft and said steering member including a big drum and a small drum each rotatable as a unit with said steering shaft and located on opposite sides of said steering member and a first pulley rotatably supported on said steering member on one side of said steering shaft and a second pulley rotatably supported on said steering member on the other side of said steering shaft and an endless flexible tension member looped over each of said first and said second pulleys and helically coiled around an outside surface of each of said big drum and said small drum, rotation of said steering shaft in one direction rendering a first side of said Chinese Windlass an active side operative to pull said steering member in one direction of movement and the other side of said Chinese Windlass an inactive side operative to permit idling movement of said steering member in said one direction of movement.

2. The steering gear recited in claim 1 wherein said steering member includes a first section supported on said sprung mass portion for bodily shiftable movement along said transverse axis and having an outboard end connected to one of said dirigible wheels and an inboard end, a second section supported on said sprung mass portion for bodily shiftable movement along said transverse axis and having an outboard end connected to the other of said dirigible wheels and an inboard end, means defining a pilot bore at said inboard end of said first section and a pilot flange at said inboard end of said second section slidably received in said pilot bore whereby said first and said second sections define a rigid beam of variable length, and a compression spring disposed between said first and said second sections biasing said first and said second sections for relative separation along said transverse axis whereby said endless tension member is maintained taut.

3. The steering gear recited in claim 2 wherein each of said big drum and said small drum is a right cylinder.

4. In an automotive vehicle having a pair of steerable dirigible wheels supported on a sprung mass portion of said vehicle for steering movement, a steering gear comprising:

a steering member disposed on said sprung mass portion for bodily shiftable movement along a transverse axis of said sprung mass portion, means connecting the opposite ends of said steering member to respective ones of said steerable dirigible wheels so that transverse bodily shiftable movement of said steering member effects concurrent steering movement of each of said dirigible wheels, a windlass shaft disposed on said sprung mass portion for rotation about a windlass shaft axis of said sprung mass portion intersecting said transverse axis, means defining a bi-directional Chinese Windlass between said windlass shaft and said steering member including a big drum and a small drum each rotatable as a unit with said windlass shaft and located on opposite sides of said steering member and a first pulley rotatably supported on said steering member on one side of said windlass shaft and a second pulley rotatably supported on said steering member on the other side of said windlass shaft and an endless flexible tension member looped over each of said first and said second pulleys and helically coiled around an outside surface of each of said big drum and said small drum, rotation of said windlass shaft in one direction rendering a first side of said Chinese Windlass an active side operative to pull said steering member in one direction of movement and the other side of said Chinese Windlass an inactive side operative to permit idling movement of said steering member in said one direction of movement, and a reversible electric motor on said sprung mass portion connected to said windlass shaft and operative when turned on to rotate said windlass shaft in opposite directions.

5. The steering gear recited in claim 4 wherein said steering member includes a first section supported on said sprung mass portion for bodily shiftable movement along said transverse axis and having an outboard end connected to one of said dirigible wheels and an inboard end, a second section supported on said sprung mass portion for bodily shiftable movement along said transverse axis and having an outboard end connected to the other of said dirigible wheels and an inboard end, means defining a pilot bore at said inboard end of said first section and a pilot flange at said inboard end of said second section slidably received in said pilot bore whereby said first and said second sections define a rigid beam of variable length, and a compression spring disposed between said first and said second sections biasing said first and said second sections for relative separation along said transverse axis whereby said endless tension member is maintained taut.

6. The steering gear recited in claim 5 and further including a first steering shaft on said sprung mass portion rotatable about a steering axis of said sprung mass portion and having a steering wheel connected thereto, a second steering shaft on said sprung mass portion rotatable about said steering axis and having a pinion gear rotatable therewith, means including a torque sensor means connecting said first steering shaft to said second steering shaft for essentially unitary rotation about said steering axis, electronic controller means between said reversible electric motor and said torque sensor operative to turn said motor on and off when said torque sensor senses a manual steering input at said steering wheel, and means defining a plurality of rack teeth on said steering member meshing with said pinion gear.

7. The steering gear recited in claim 6 wherein each of said big drum and said small drum is a right cylinder.

* * * * *